UNITED STATES PATENT OFFICE 2,183,597

STABILIZED SUGAR SIRUP

Daniel V. Wadsworth and Leonard Wickenden, Manhasset, N. Y., assignors to John J. Naugle, New York, N. Y.

No Drawing. Application June 4, 1938,
Serial No. 211,801

6 Claims. (Cl. 99—142)

The present invention relates to sugar sirup for use in the preparation of food products, especially milk products, such as ice cream, chocolate milk, cheese, etc. The invention also relates to the methods of obtaining such sirup.

In the accompanying specification there will be described several illustrative embodiments of the methods of the present invention and the product resulting from the practice of such methods. It is however to be clearly understood that the invention is not limited to the exact details of the methods herein described for purposes of illustration only. It is also to be understood that the present invention is not limited to the production of the specific product herein described for purposes of illustration only. Obviously changes in the methods and the resulting product may be made without the exercise of invention and within the scope of the claims hereto appended.

Before describing the invention in detail, it is deemed advisable briefly to refer to the prior art in the field to which the present invention relates, and to point out the disadvantages thereof and the manner in which the present invention overcomes and eliminates the same.

In the manufacture of milk products, such as those referred to hereinbefore, it is necessary to use a stabilizer in order to give to the product the proper body and to maintain therein uniformity and proper texture. In the absence of a stabilizer in ice cream, the water content does not remain absorbed and has a tendency to form large crystals, thus coarsening the product. In chocolate milk not containing a stabilizer, there is a tendency for the cocoa fibres to settle out; and similar disadvantages are present in other milk products not including a stabilizer.

Heretofore there has been used for this purpose, gelatin, starch, various alignates and various gums, such as tragacanth and acacia gum. In addition, there has been used a carbohydrate gum extracted from Chondrus crispus, a sea weed, commonly known as Irish moss. This moss is offered on the market in a dry form, either natural or bleached, and its use has presented several problems. For one thing, the gum extracted from it, which is usually offered as a dry powder, must be fully dissolved in the mixture in which it is used or else it interferes with the final texture. This requires either extremely careful mixing or previous preparation in solution form. The latter procedure obviously causes dilution of the final mixture. Another disadvantage resides in the fact that the gum has an undesirable taste and odor and consequently interferes with the taste of the final product. The present invention offers a stabilizer in the form of a sugar sirup containing an extract of Irish moss which may be directly added to any of the milk mixes and thus overcomes the foregoing disadvantages and presents the following advantages.

The stabilizer is already in solution and is therefore convenient to handle. Being in solution, it can be used cold.

While stabilizers, particularly those derived from sea weeds, have a distinct flavor and odor thus preventing the production, for example, of a pure flavored vanilla ice cream, the present invention presents a stabilizer which is flavorless, odorless and entirely free from color.

Furthermore, the gum-containing sirup of the present invention will keep almost indefinitely due to the density at which it is prepared and stored.

Other objects and advantages of the present invention will readily occur to those skilled in the art to which the present invention relates.

Referring now more in detail to the aforesaid illustrative embodiment of the product of the present invention and the methods of obtaining the same, a quantity of natural Irish moss is washed in cold water so as to remove therefrom any adhering salt or other impurities not desirable in the final product. The washed moss is then soaked in water for about one hour, at the end of which time the water is boiled for about thirty minutes. It has been found that this boiling results in the extraction from the moss of from 60% to 80% of its original dry weight.

At the end of the boiling period there is added to the solution obtained an activated carbon preferably of vegetable origin, such as the highly activated carbon known to the trade as "Suchar". The quantity of carbon added will, of course, vary with the amount of coloring, flavoring and odor-imparting matter present in the moss and it will also vary with the degree of purification desired in the finished product. It has been found that an amount equal to from 5% to 10% based on the weight of the extracted matter is most suitable. The mixture of extracted matter and carbon may be given a further boiling for about thirty minutes, after which the mixture is strained, by any preferred means to remove the fibrous residue of the moss, this step resulting in obtaining a mixture of the gums from the moss and carbon.

If desired, the fibrous residue resulting from the straining may be subjected to pressure in order to remove therefrom any remaining soluble matter or, if more convenient, it may be subjected to repeated boilings until no further extractive matter can be obtained.

It is now necessary to remove the added carbon from the soluble matter. This, however, under ordinary conditions presents great difficulty. The finer particles of the carbon are apparently absorbed by the gum and enter into what seems to be a colloidal condition. The bond between the gum and the carbon is so strong that even repeated filtration through a thick layer of kieselguhr fails to remove the final traces of carbon and the resulting filtrate is grayish-brown in color. Not only is its appearance very unattractive, but it tends to discolor any light-colored product to which it is added.

It is obvious that it would not be practicable to treat the solution of gum with activated carbon unless the complete removal of the carbon could be subsequently effected. While all methods of straight filtration without additional treatment have failed to remove the final traces of carbon, it has been found that two methods are effective in breaking the bond between the carbon particles and the gum so that perfectly clear filtrates can be obtained containing no trace of carbon.

The first of these methods is to adjust the pH of the mixture so that it lies within a definite range. The normal pH of a solution of the gum has been found to lie between 6.0 and 6.5. At this range of pH a very strong bond is formed between the fine particles of carbon and the gum in solution. If the pH is lowered, the bond appears to become still stronger, so that the filtrate from the mixture of carbon and gum is almost black. This is true at pH's ranging from 4.5 to 5.0. If the pH is lowered further still, so that the mixture becomes strongly acid, hydrolysis of the gum takes place, the bond between the gum and the carbon is broken and relatively clear filtrates are obtained. However, this extreme lowering of the pH results, of course, in a destruction of the gum as such, with a resulting loss in its valuable properties. The use of large quantities of acid in order to break the bond between the gum and the carbon is, therefore, impracticable.

It has been found that there is another range of pH in which the bond between the carbon and the gum weakens sufficiently to make it possible to separate the carbon from the solution so as to give a perfectly clear filtrate.

By raising the pH of the solution by the addition of alkalies a satisfactory separation again occurs upon filtration. It has been found that the most satisfactory range for filtration lies between 7.0 and 8.0. Clear filtrates are also obtained above that range but some discoloration of the material occurs and there is a tendency to lose some of the valuable properties. Apparently any alkaline salt can be used successfully for bringing the pH to the desired range, as equally satisfactory results have been obtained with alkaline phosphates and with carbonate and hydroxide of sodium.

The procedure which is followed is to add the alkaline salt in sufficient quantity to raise the pH to between 7.0 and 8.0. This can be done either before the addition of carbon or after the addition of carbon but prior to filtration. It is then filtered, preferably at a low pressure and through a layer of kieselguhr. The filtrate thus obtained is perfectly clear and free from color, odor and flavor.

To the decolorized, deflavored and deodorized solution there is added sufficient granulated sugar so as to result in a sirup of approximately 67° Brix. It has been found that the sirup should contain in solution from 0.2 to 1.0% of the extractive matter from the Irish moss. While higher percentages of this extractive matter may be used if desirable, it has been found that for most purposes from 0.4 to 0.6% of the extractive matter based upon the weight of the dry sugar present is sufficient to bring about the stabilizing effects necessary in the subsequent production of milk products.

An alternative procedure to the dissolving of granulated sugar in the purified moss solution is to add to such solution a sugar sirup of any kind which may contain more or less invert and more or less ash. As a matter of fact, it has been found that a sirup prepared from unwashed raw sugar is more desirable than one prepared from refined granulated sugar. The sirup obtained from unwashed raw sugar obviously contains more ash and apparently the presence of the ash results in an increase in the viscosity of the sirup.

An alternative method by which the carbon can be separated from the gum is to give the mixture of extract and carbon a rough filtration which will not entirely remove the carbon therefrom. If desired the liquid coming from the strainer may be used without further filtration. If either of these solutions is then mixed with the desired amount of sugar sirup and if the two solutions are then filtered together, either with or without the addition of more carbon, the bond between the carbon and the gum is again loosened sufficiently to produce a perfect clarification of the liquid. It is thus possible to bring about clarification of the extract and decolorization of the sirup at one and the same time. If preferred, a water extract of the moss can be prepared and this extract can be used to dilute a heavy sugar sirup to any desired Brix, after which carbon can be added to the mixture and purification of the sirup and extract brought about simultaneously by filtration with the carbon.

A satisfactory extract of the moss can be made by still another method. The Irish moss may be soaked in water for about an hour at the end of which time the solution is permitted to boil for about fifteen minutes. We then add sugar, in dry or sirup form, directly to the mixture of moss and water so as to result in a solution having a density of about 67° Brix and in which there is from about 0.2 to about 1.0% of the extractive matter from the moss, based on the weight of the sugar solids. The solution is then given an additional boiling for about fifteen minutes. With this procedure the extraction is somewhat more efficient than hereinbefore described probably due to osmosis in view of the fact that the density of the surrounding sugar is higher than the liquid matter in the cells of the moss.

After preparing an extract with a sugar sirup as described above, sufficient carbon is added to decolorize both sirup and extract and filtration is carried out along the lines outlined in the previous examples.

The resulting sirup may now be used directly in the preparation of ice cream or other milk mixes or it can be stored and used as a stock whenever desired. If preferred, some of the water therein can be removed by evaporation, thus obtaining a more highly concentrated form.

This completes the description of the methods of the present invention and the product resulting therefrom. It will readily be understood by those skilled in the art to which the present invention relates that the present invention overcomes the disadvantages heretofore present in the art and outlined in the early portions of this specification and that the sirup constituting the final product of the present invention offers the advantages set forth in detail in the earlier portion of this specification.

What we claim as our invention is:

1. The method of preparing a stock stabilizer for use in connection with dairy products which consists in the steps of extracting the soluble gums from Irish moss, adding an activated carbon as a filtering agent to the extract, adding sugar to the mixture of extract and filtering agent, and thereafter filtering the mixture to obtain a deodorized, deflavorized and decolorized sirup.

2. The method of preparing a stock stabilizer for use in connection with dairy products, which consists in the steps of extracting the soluble gums from Irish moss, adding an activated carbon as a filtering agent to the extract, adding sugar to the mixture of extract and filtering agent in an amount sufficient to obtain a mixture having a density of about 67° Brix and containing from about 0.2 to about 1.0% of the soluble extractive matter based on the weight of the sugar solids, and thereafter filtering the mixture to obtain a decolorized, deodorized, and deflavorized sirup.

3. The method of preparing a stock stabilizer for use in connection with dairy products which consists in the steps of soaking and boiling Irish moss to obtain an extract of the soluble gums therefrom, adding an activated carbon as a filtering agent to the extract so obtained, adjusting the pH of the extract to a reading of from 7.0 to 8.0 to break the bond between the filtering agent and the gums in the extract, thereafter filtering the mixture to obtain a deodorized, deflavorized and decolorized filtrate and thereafter adding to the filtrate sugar, to obtain a stock.

4. The method of preparing a stabilizer for use in connection with dairy products which consists of the steps of soaking and boiling Irish moss to obtain an extract of the soluble gums therefrom, adding an activated carbon as a filtering agent to the mixture so obtained, adjusting the pH of the extract to a reading of from 7.0 to 8.0 to break the bond between the filtering agent and the gums in the extract, filtering the mixture to obtain a deodorized, deflavorized and decolorized extractive filtrate, and thereafter adding to the filtrate sugar, to obtain a stock having a density of about 67° Brix and containing from about 0.2 to about 1.0% of the soluble extractive matter based on the weight of the sugar solids.

5. The method of preparing a stock stabilizer for use in connection with dairy products which consists in the steps of extracting the soluble gums from Irish moss, first with water and then with a sugar sirup by adding sugar to the extract, adding an activated carbon to the extract as a filtering agent to form a mixture and thereafter filtering the mixture of extract and filtering agent to deodorize, decolorize, and deflavorize the same.

6. The method of treating Irish moss which consists in the steps of soaking and boiling the same in a sugar solution to obtain an extract incorporated in said solution, adding an activated carbon to the mixture of extract and sugar, and thereafter filtering the mixture to obtain a decolorized, deflavorized, and deodorized sugar filtrate having incorporated therein an extract of Irish moss.

DANIEL V. WADSWORTH.
LEONARD WICKENDEN.